(12) United States Patent
Watson et al.

(10) Patent No.: US 11,508,092 B2
(45) Date of Patent: Nov. 22, 2022

(54) EDGE-BASED CROP YIELD PREDICTION

(71) Applicant: X Development LLC, Mountain View, CA (US)

(72) Inventors: Kathleen Watson, Sunnyvale, CA (US); Jie Yang, Sunnyvale, CA (US); Yueqi Li, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 108 days.

(21) Appl. No.: 16/715,285

(22) Filed: Dec. 16, 2019

(65) Prior Publication Data

US 2021/0183108 A1   Jun. 17, 2021

(51) Int. Cl.
*G06T 7/00* (2017.01)

(52) U.S. Cl.
CPC ...... *G06T 7/97* (2017.01); *G06T 2207/10032* (2013.01); *G06T 2207/20081* (2013.01); *G06T 2207/20084* (2013.01); *G06T 2207/20212* (2013.01); *G06T 2207/30188* (2013.01)

(58) Field of Classification Search
CPC ............ G06T 7/97; G06T 2207/10032; G06T 2207/30188; G06T 2207/20084; G06T 2207/20212; G06T 2207/20081
See application file for complete search history.

(56) References Cited

U.S. PATENT DOCUMENTS

| 5,897,619 | A | 4/1999 | Hargrove et al. |
| 7,854,108 | B2 | 12/2010 | Koselka et al. |
| 10,255,670 | B1 * | 4/2019 | Wu .................. H04N 7/183 |
| 11,240,961 | B2 * | 2/2022 | Anderson ............ A01D 41/127 |
| 2005/0192760 | A1 | 9/2005 | Dunlap |
| 2006/0213167 | A1 * | 9/2006 | Koselka ............... A01B 51/026 56/10.2 A |
| 2016/0078570 | A1 | 3/2016 | Ethington et al. |
| 2017/0251589 | A1 | 9/2017 | Tippery et al. |

(Continued)

FOREIGN PATENT DOCUMENTS

| JP | 2003006612 | 1/2003 |
| WO | 2018081759 | 5/2018 |

(Continued)

OTHER PUBLICATIONS

European Patent Office; International Search Report and Written Opinion of PCT Ser. No. PCT/US2020/061887; 10 pages; dated Jan. 22, 2021.

(Continued)

*Primary Examiner* — Bobbak Safaipour
(74) *Attorney, Agent, or Firm* — Middleton Reutlinger

(57) ABSTRACT

Implementations are described herein for edge-based real time crop yield predictions made using sampled subsets of robotically-acquired vision data. In various implementations, one or more robots may be deployed amongst a plurality of plants in an area such as a field. Using one or more vision sensors of the one or more robots, a superset of high resolution images may be acquired that depict the plurality of plants. A subset of multiple high resolution images may then be sampled from the superset of high resolution images. Data indicative of the subset of high resolution images may be applied as input across a machine learning model, with or without additional data, to generate output indicative of a real time crop yield prediction.

17 Claims, 8 Drawing Sheets

(56) References Cited

U.S. PATENT DOCUMENTS

| | | | |
|---|---|---|---|
| 2018/0025480 A1 | 1/2018 | Dingle et al. | |
| 2018/0070527 A1 | 3/2018 | Richt | |
| 2018/0137357 A1 | 5/2018 | Margalit et al. | |
| 2018/0189564 A1 | 7/2018 | Freitag et al. | |
| 2018/0211156 A1 | 7/2018 | Guan et al. | |
| 2018/0293671 A1 | 10/2018 | Murr et al. | |
| 2018/0295783 A1* | 10/2018 | Alexander | A01G 7/00 |
| 2018/0308229 A1 | 10/2018 | Winkler et al. | |
| 2018/0330247 A1 | 11/2018 | Cohen | |
| 2018/0349708 A1* | 12/2018 | Van Hoof | G08B 13/19684 |
| 2018/0350054 A1* | 12/2018 | Fox | G08G 5/0069 |
| 2019/0050948 A1* | 2/2019 | Perry | G06V 20/188 |
| 2019/0101605 A1* | 4/2019 | Hyun | G01R 33/5611 |
| 2019/0150357 A1* | 5/2019 | Wu | G06T 7/73 |
| 2020/0074589 A1* | 3/2020 | Stent | G06K 9/6274 |
| 2020/0126232 A1* | 4/2020 | Guo | G06Q 10/04 |
| 2020/0218961 A1* | 7/2020 | Kanazawa | G06N 20/20 |
| 2021/0027426 A1* | 1/2021 | Ma | G06T 3/4069 |
| 2021/0067848 A1* | 3/2021 | Kanazawa | G08C 19/00 |
| 2021/0209747 A1* | 7/2021 | Jung | G01N 21/17 |
| 2021/0409669 A1* | 12/2021 | Wang | H04N 13/117 |
| 2022/0007589 A1* | 1/2022 | Binney | A01G 9/088 |

FOREIGN PATENT DOCUMENTS

| | | |
|---|---|---|
| WO | 2019032648 | 2/2019 |
| WO | 2019038325 | 2/2019 |

OTHER PUBLICATIONS

De Boer, P. T., et al. "A Tutorial on the Cross-Entropy Method"; 47 pages; Sep. 2, 2003.

Lantz, W., et al. "Season-Long: Strawberry Production with Everbearers for Northeastern Producers EB 401." Garrett County Office; 70 pages; (2011).

Maskey, M., et al. "Weather Based Strawberry Yield Forecasts at Field Scale Using Statistical and Machine Learning Mlodels." Atmosphere 10, No. 7, 378; 18 pages; 2019.

Vega, A., et al. "Protocol for automating error removal from yield maps." Precision Agriculture (2019); https://doi.org/10.1007/s11119-018-09632-8; 15 pages; Jan. 2019.

You, J., et al. "Deep Gaussian Process for Crop Yield Prediction Based on Remote Sensing Data." Thirty-First AAAI Conference on Artificial Intelligence; pp. 4559-4565; 2017.

Grant, "Edge-based inference acceleration" Digitimes Inc. May 28, 2019. 6 Pages. Retreived from https://www.digitimes.com/news/a20190522PR206.html?chid=9.

Zhou et al., "Edge Intelligence: Paving the Last Mile of Artificial Intelligence with Edge Computing" Cornell University. May 24, 2019. arXiv:1905.10083 [cs.DC] 24 Pages.

Lee, W.S.; Citrus Yield Mapping System in Natural Outdoor Scenes using the Watershed Transform; dated Jul. 2006.

Calafell, Davinia; Application of image processing methodologies for fruit detection and analysis; Universitat de Lleida; 86 pages; dated Jul. 2014.

Climaie Fieldview—Yield Analysis; Video retrieved from https://www.youtube.com/watch?v=G6M-YGolxeA; dated Nov. 31, 2017.

Google Glass—New Tool for Ag; Video retrieved from https://www.youtube.com/watch?v=drypBC4bzLg; dated Oct. 31, 2014.

Grassi, Mathew; Google Glass: New Tool For Ag; dated Oct. 8, 2014.

Klompenburg, Thomas et al.; Crop yield prediction using machine learning: A systematic literature review Computers and Electronics in Agriculture; 18 pages; dated 2020.

\* cited by examiner

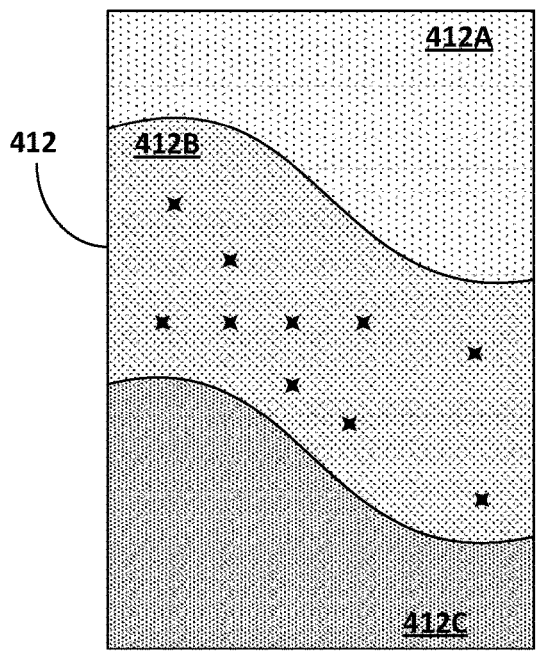 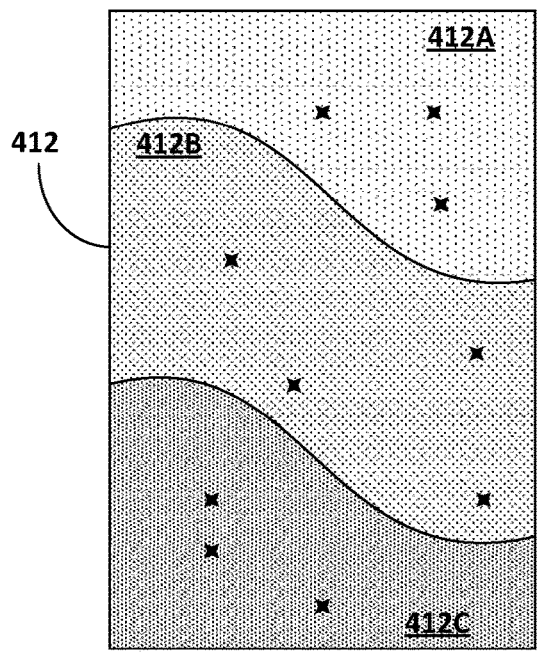
Fig. 4A　　　　　　　　　　Fig. 4B
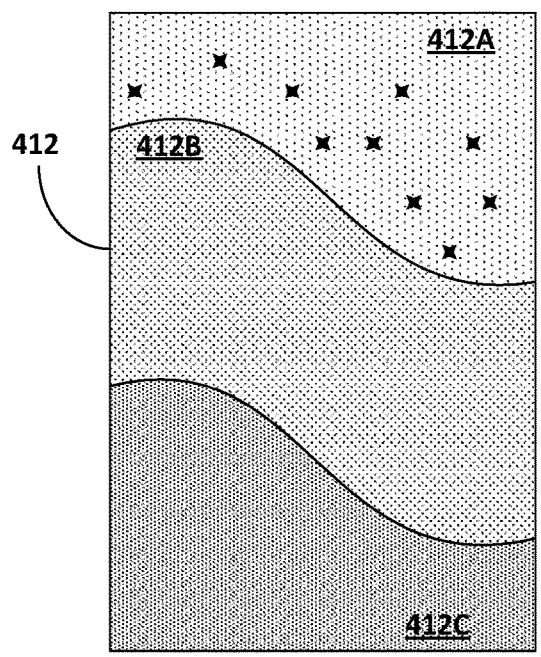
Fig. 4C

EDGE-BASED CROP YIELD PREDICTION

BACKGROUND

"Everbearing" or "everblooming" crops such as strawberries may bear plant parts of economic and/or nutritional interest more or less continuously. Consequently, these crops may be harvested multiple times, rather than once at the end of a crop cycle as is the case for other crops like corn. For example, strawberry plants continuously produce additional strawberries even after initial strawberries have been picked from the plants.

For strawberries and other similar crops, there is considerable risk associated with producing too much or not enough fruit. If a farmer's crop yield fails to satisfy a request from a distributor, the farmer may be forced to purchase fruit elsewhere at a premium in order to satisfy the farmer's obligation. If the farmer's crop yield exceeds the farmer's obligation, the farmer may be forced to waste fruit and/or sell excess fruit as a substantial discount. Moreover, farmers are often required to pre-hire workers to pick everbearing crops such as strawberries, and hiring the correct number of workers may be difficult if the farmers are unable to make timely and accurate crop yield predictions.

To attempt to mitigate these risks, farmers may obtain crop yield predictions generated using data captured by satellites, robot(s), and/or humans deployed in an area such as a field. These robots/humans may acquire a massive amount of data that may be used, alone or in in combination with other data such as local weather data, to make crop yield predictions. However, there are seldom sufficient computing resources at the "edge" (e.g., the rural field(s) in which crops are grown) to adequately harvest this massive data to make timely and accurate crop yield predictions, especially for everbearing crops. Moreover, bandwidth may be limited between the edge and a centralized computing center more capable of performing these intensive calculations.

SUMMARY

Implementations are described herein for generating real time crop yield predictions at the edge that are sufficient to allow farmers of everbearing crops to accurately pledge crop output to various entities. In particular, techniques are described herein for capturing high resolution vision data using robots deployed in the field, and then making real time crop yield predictions based on sampled subset(s) of the high resolution data (as well as on other data, such as local weather data, soil samples, farming practices, etc.). Rather than being performed at some centralized computing center (sometimes referred to as the "cloud"), these real time crop yield predictions may be made relatively quickly at the "edge," e.g., on the robot(s) themselves or on a computing system local to the edge that is able to receive the sampled subset(s) of the high resolution images relatively quickly (e.g., using Wi-Fi or Bluetooth). As used herein, "real time" may include instantaneously, or at least within some time period after the vision data is captured by the robot(s) that is substantially less than, for instance, a time period required to physically transport portable harddrives containing the massive robot/human/satellite data described previously to a cloud-based computing center with considerably more processing resources than would be available at the edge.

In some implementations, a method for predicting crop yield of a crop in an area in real time may include: deploying one or more robots amongst a plurality of plants; acquiring, using one or more vision sensors of one or more of the robots, a superset of high resolution images that depict the plurality of plants; sampling, from the superset of high resolution images using one or more processors local to the area, a subset of multiple high resolution images; applying, by one or more of the processors local to the area, data indicative of the subset of high resolution images as input across a machine learning model, along with local weather data, to generate output indicative of a real time crop yield prediction; and generating, by one or more of the processors local to the area based on the output, for presentation at one or more computing devices, the real time predicted crop yield.

In some implementations, the sampling, applying, and generating may be performed onboard one or more of the robots. In various implementations, the method may further include processing the subset of high resolution images to generate one or more embeddings, wherein the data indicative of the subset of high resolution images comprises the one or more embeddings. In various implementations, the processing may include applying the subset of high resolution images as input across a convolutional neural network. In various implementations, the method may include combining a plurality of constituent image embeddings together to form a composite embedding that represent crops across the area.

In various implementations, the sampling may include sampling the subset of high resolution images from another subset of the high resolution images that were acquired in one or more predetermined sectors of the area. In various implementations, the method may further include selecting the one or more predetermined sectors of the area based on one or more satellite images of the area. In various implementations, the one or more predetermined sectors of the area may be selected based on accuracies of past real time predicted crop yields generated from sampled subsets of high resolution images of the area. In various implementations, the one or more predetermined sectors of the area may be selected by: sampling, from the superset of high resolution images, a plurality of sampled subsets; generating a plurality of crop yield predictions based on the plurality of sampled subsets; and selecting, as one or more of the predetermined sectors of the area, a sector of the area from which the sampled subset yielded a crop yield prediction that most closely matched the delayed crop yield prediction.

In another related aspect, a processor-implemented method for training a machine learning model to predict crop yield of a crop in an area in real time may include: deploying one or more robots amongst a plurality of plants; acquiring, using one or more vision sensors of one or more of the robots, a superset of high resolution images that depict the plurality of plants; sampling, from the superset of high resolution images, a subset of multiple high resolution images; applying data indicative of the subset of high resolution images as input across the machine learning model, along with local weather data, to generate output indicative of a real time crop yield prediction; comparing the real time crop yield prediction to a delayed crop yield prediction generated based on the superset of high resolution images, wherein the delayed crop yield prediction is more accurate than the real time crop yield prediction; and training the machine learning model based on the comparing. In various implementations, the method may further include applying data indicative of the superset of high resolution images as input across the machine learning model to generate additional output indicative of the delayed crop yield prediction.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 4A, 4B, and 4C depict an example of how satellite data may be used to selectively sample vision data for processing using techniques described herein.

DETAILED DESCRIPTION

Figure 1:
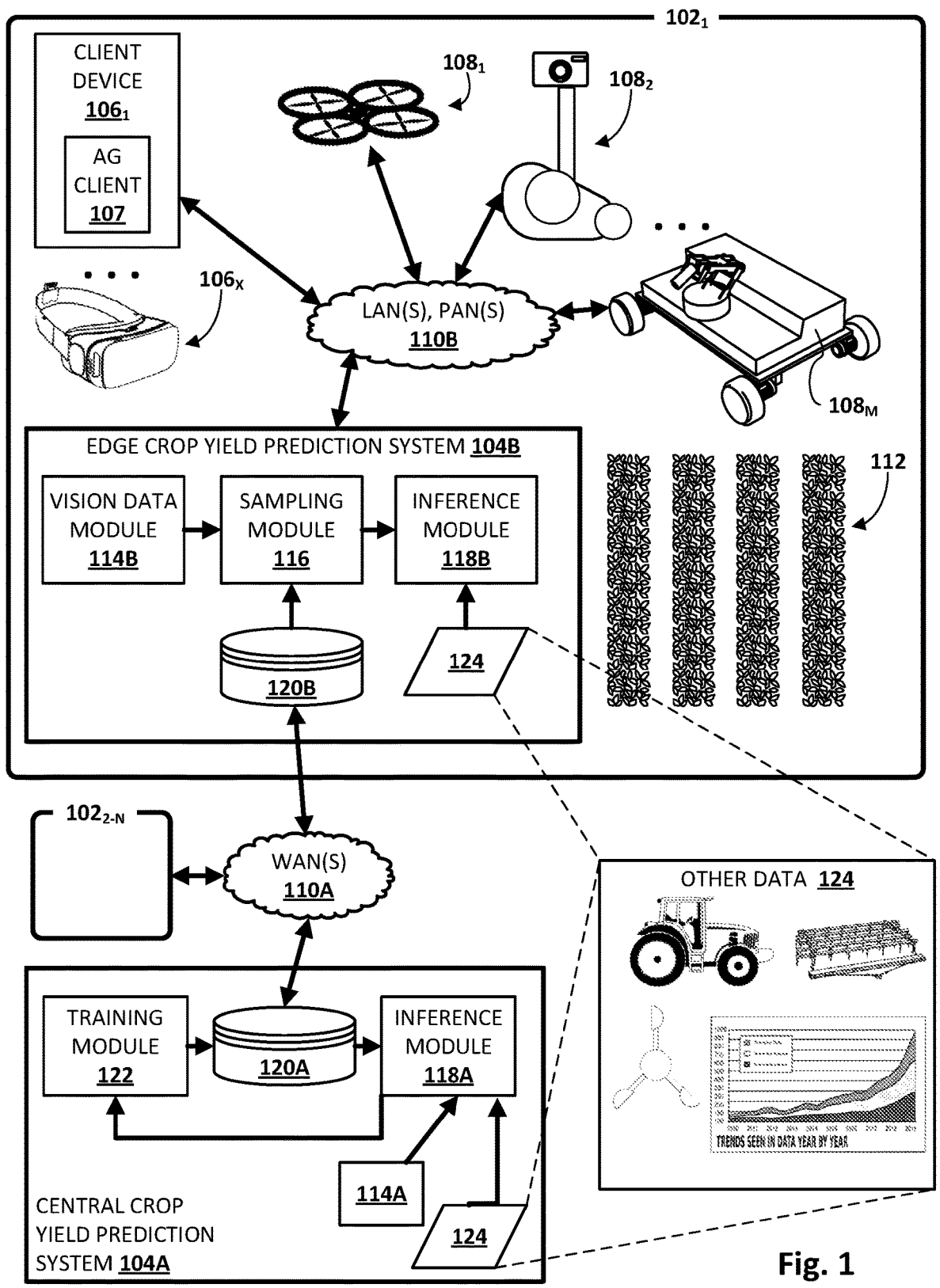
FIG. 1 schematically depicts an example environment in which disclosed techniques may be employed in accordance with various implementations.

Implementations are described herein for real time crop yield predictions that—while perhaps somewhat less accurate than the centralized delayed crop yield prediction techniques described previously—are still sufficient to allow farmers of everbearing crops to accurately pledge crop output to various entities. In particular, techniques are described herein for capturing high resolution vision data using robots deployed in the field, and then making real time crop yield predictions based on sampled subset(s) of the high resolution data (as well as on other data, such as local weather data, soil samples, farming practices, etc.). Rather than being performed at a centralized computing center, these real time crop yield predictions may be made more quickly at the "edge," e.g., on the robot(s) themselves or on a computing system that is able to receive the sampled subset(s) of the high resolution images relatively quickly (e.g., using Wi-Fi or Bluetooth).

In some implementations, real-time crop yield predictions may be made by applying various data as input across one or more machine learning models to generate output indicative of crop yield predictions. These machine learning models may take various forms, such as various types of neural networks, including but not limited to a convolutional neural network ("CNN"), a recurrent neural network ("RNN"), a long short-term memory ("LSTM") network, a gated recurrent unit ("GRU") network, a transformer neural network, and so forth. Additionally or alternatively, in some implementations, other types of models may be employed, including but not limited to support vector machines, random forests, decision trees, and so forth.

In various implementations, input for the machine learning model(s) may include sampled subset(s) of high resolution vision data captured by robot(s), local weather data (e.g., from satellite, county weather station(s), local weather stations/sensors, etc.), historical crop yield data, soil measurements (e.g., pH, moisture, nutrient levels), past crops planted in same field (crop rotation history), chemicals such as fertilizers, pesticides, herbicides applied to crops, and so forth. In areas where hyper-local weather sensors are not available, local weather conditions may be inferred, e.g., based on surrounding weather patterns, regional weather, etc. As will be described below, sampling subsets of high resolution images may reduce the amount of data that is processed substantially, which in turn reduces computational complexity (and latency) considerably as well.

To further reduce computational complexity (and in turn, latency, required computing resources, etc.), in some implementations, the sampled subset(s) of high resolution vision data may first be processed, e.g., using a machine learning model such as a CNN, to generate reduced-dimensionality embedding(s) (e.g., in latent space). From these embeddings, it may not be possible to obtain as accurate a count of plant parts of interest (and hence, a crop yield prediction) as, say, the three-dimensional point clouds described previously. However, these embeddings may still be good representations of, for instance, fruit density, and thus may be more than adequate to quickly make crop yield predictions or estimations that are "good enough" for farmers to competitively bid out their produce in real time. In particular, these embeddings may be applied as input across another machine learning model trained to predict crop yields, such as a recurrent neural network, LSTM network, GRU network, or even a feed-forward neural network, to generate in real time the output indicative of predicted crop yield(s).

The crop yield prediction machine learning model(s) may be trained in various ways based on various data. For example, in some implementations, data indicative of a sampled subset of high resolution images may be applied as input across one or more of the aforementioned machine learning models, e.g., along with other input(s) such as local weather data, to generate output indicative of a real time crop yield prediction. This real time crop yield prediction may later be compared to a "delayed crop yield prediction" that is generated, for instance, based on a superset of high resolution images from which the subset was sampled. The machine learning model may then be trained based on the comparing, e.g., using techniques such as gradient descent, back propagation, etc.

As described previously, this delayed crop yield prediction may not be available until hours or even days after the robot(s) capture the data. While this delay was not acceptable for real time crop yield prediction, because the delayed crop yield prediction is being used instead for training purposes, the delay may be acceptable. Notably, in some such implementations, the real time crop yield prediction is not compared to "ground truth" data that represents the actual crop yield that was ultimately realized (although ground truth may be used in addition to or instead of the delayed data). Rather, the real time crop yield prediction may be compared to the "delayed crop yield prediction," which as its name suggests is a prediction, not ground truth. Nevertheless, the delayed crop yield prediction is typically more accurate than the real time crop yield prediction, e.g., due to the virtually limitless resources that may be available at the centralized computing center (not to mention the massive data used to make the delayed crop yield predictions). Accordingly, training the machine learning model by comparing the real time and delayed crop yield predictions still serves to improve the model's performance.

As noted previously, all of the vision data acquired by robot(s) may be too massive to generate timely crop yield predictions in at a location that lacks powerful computing resources. Even if all the vision data is processed to generate the reduced-dimensionality embeddings described previously, there still may be issues with overlap between images, not to mention the overall data may still be massive. Accordingly, in addition to or instead of reducing the dimensionality of vision data captured by robot(s), subset(s) of vision data gathered by the robot(s) may be sampled and applied (e.g., as raw data or embeddings) as input across the aforementioned machine learning model(s) to generate real time crop yield predictions.

Subset(s) of vision data may be sampled from "superset(s)" of vision data acquired by robot(s) in various ways. In some implementations, random sampling may be employed to generate a subset of randomly-selected digital images of plants. In some such implementations, the random sampling may be performed to ensure that each randomly sampled image is not acquired from a position too proximate to a position at which another randomly sampled image was acquired (e.g., to avoid image overlap).

It may be beneficial to ensure that subset(s) of high resolution images are sampled from portions of fields ("sectors" herein) that are not significant outliers in terms of environmental conditions, crop output, etc. Intuitively, it is better to sample pictures acquired in sector(s) of a field that are relatively predictive of the field's output as a whole. Accordingly, in some implementations, a subset of high resolution images may be sampled from another subset of the high resolution images that were acquired in one or more "predetermined sectors" of an area such as a field, farm etc. These "predetermined sectors" may be representative of the areas' potential output as a whole. The predetermined sectors from which subset(s) of high resolution images are sampled may be selected/identified in various ways. In some implementations, the predetermined sectors may be selected based on one or more satellite images of the area, e.g., taken over time, which reveal the most uniform areas of the field (as opposed to, say, portions of the field that receive too much runoff water, shade, etc.).

In some implementations, the predetermined sectors may be selected based on accuracies of past real time predicted crop yields generated based from sampled subsets of high resolution images of the area. For example, if subset(s) of high resolution images were sampled from one quadrant of a field during a previous crop cycle, and the crop yield predictions made from those subset(s) proved to be inaccurate, then that quadrant may be "demoted" in favor of other, perhaps more representative quadrant(s) of the field.

In some implementations, the predetermined sectors may be selected "offline" at the centralized computing center. For example, the predetermined sector(s) may be identified/selected by sampling subset(s) of a superset of high resolution images acquired by robot(s) deployed in an area such as a field, e.g., by random sampling, sampling based on satellite data, etc. A plurality of "offline" crop yield predictions may be performed, e.g., at the centralized computing center, based on the plurality of sampled subsets. These offline crop yield predictions may then be compared to the aforementioned delayed crop yield prediction (or even to ground truth data). Based on the comparison, a sector of the area may be selected from which the respective sampled subset yielded a crop yield prediction that most closely matched the delayed crop yield prediction.

FIG. 1 schematically illustrates an environment in which one or more selected aspects of the present disclosure may be implemented, in accordance with various implementations. The example environment includes a plurality of edge sites $102_{1-N}$ (e.g., farms, fields, or other areas in which crops are grown) and a central crop yield prediction system 104A. Additionally, one or more of the edge sites 102, including at least edge site $102_1$, includes an edge crop yield prediction system 104B, a plurality of client devices $106_{1-X}$, a plurality of robots $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soy beans, corn, lettuce, spinach, beans, cherries, nuts, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which crop yield estimates may be of interest. Each edge site 102 may include the same or similar components as those depicted in FIG. 1 as part of edge site $102_1$. Components of edge sites $102_{1-N}$ are in network communication with each other and with central crop yield prediction system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth).

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central crop yield system 104A and edge crop yield prediction system 104B (collectively referred to herein as "crop yield prediction system 104") comprise an example of an information system in which the techniques described herein may be implemented. Each of client devices 106 and crop yield prediction system 104 may include one or more memories for storage of data and software applications, one or more processors for accessing data and executing applications, and other components that facilitate communication over a network. The operations performed by client device 106 and/or crop yield prediction system 104 may be distributed across multiple computer systems.

Each client device 106 may operate a variety of different applications that may be used, for instance, to obtain and/or analyze crop yield estimates (real time and delayed) that were generated using techniques described herein. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual robots $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_M$, or any other form of robot capable of being propelled or propelling itself past crops of interest. In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In various implementations, edge crop yield prediction system 104B may include a vision data module 114B, a sampling module 116, and an edge inference module 118B. Edge crop yield prediction system 104B may also include one or more edge databases 120B for storing various data used by and/or generated by modules 114B, 116, and 118B, such as vision and/or other sensor data gathered by robots $108_{1-M}$, crop yield predictions, machine learning models that are applied and/or trained using techniques described herein, and so forth. In some implementations one or more of modules 114B, 116, and/or 118B may be omitted, combined, and/or implemented in a component that is separate from edge crop yield prediction system 104B.

In some implementations, edge crop yield prediction system 104B may be implemented in whole or in part on one or more computing systems that are available at edge site 102i. For example, a farm may operate one or more desktop computers, local blade servers, etc., that are configured to perform techniques described herein. Additionally or alternatively, in some implementations, edge crop yield prediction system 104B may be implemented in whole or in part by processor(s) integral with one or more robots 108. In some such implementations, a robot 108 may include user interface elements (e.g., keyboard, touchscreen, other display, speaker, microphone, etc.) that are operable to both control the robot and/or receive information about prediction crop yields from the robot. For example, the entirety of the vision data captured by the robot may be stored in a portable hard drive of the robot and transported to central crop yield prediction system 104A at the end of the day, when full, and/or when the robot has completed its scouting task. However, as described herein, the robot 108 may also be able to generate crop yield predictions that are "good enough" for most farmers in real time, e.g., using subsets of the vision data and/or by boiling the vision data down into reduced dimensionality embeddings. In some implementations, the robot(s) 108 themselves may generate these "good enough" crop yield predictions and transmit them, e.g., wirelessly in real time or near real time, to a client device 106 operated by the farmer or other agricultural personnel.

In various implementations, central crop yield prediction system 104A may be implemented across one or more computing systems that may be referred to as the "cloud." Central crop yield prediction system 104A may receive the massive vision data generated by robots $108_{1-M}$ (and/or robots at other edge sites $102_{2-N}$) and process it using various image processing techniques to make crop yield predictions. However, as noted previously, the crop yield predictions generated by central crop yield prediction system 104A may be delayed (and are referred to herein as "delayed crop yield predictions"), e.g., by the time required to physically transport portable data devices (e.g., hard drives) from edge sites $102_{1-N}$ to central crop yield prediction system 104A, and/or by the time required by central crop yield prediction system 104A to computationally process this massive data.

Agricultural personnel (e.g., farmers) at edge sites 102 may desire crop yield predictions much more quickly than this. However, and as noted previously, computing resources at edge crop yield prediction system 104B may be limited, especially in comparison to those of central crop yield prediction system 104A. Accordingly, edge crop yield prediction system 104B at edge site $102_1$ may be configured to generate "real time" crop yield predictions based on sampled subsets of vision data gathered by robots $108_{1-M}$. Other edge sites may be similarly equipped to make real time crop yield predictions. These real time crop yield predictions may be somewhat less accurate than the delayed crop yield predictions generated by central crop yield prediction system 104A. However, this loss of accuracy may be acceptable to farmers who need to be able to predict crop yields in a timely manner in order to competitively bid for orders, e.g., from distributors of plant parts of interest.

The delayed crop yield predictions made by central crop yield prediction system 104A may be used for a variety of purposes, not the least of which is to train the machine learning models used by edge inference module 118B to generate crop yield predictions in real time. For example, central crop yield prediction system 104A may include a training module 122, a central inference module 118A (which may share some characteristics with edge inference module 118B), and a central database 120A that stores one or more machine learning models. Central crop yield prediction system 104A in general, and training module 122 and/or central inference module 118A in particular, may be configured to train those machine learning models (before and/or throughout their deployment) to generate the real time crop yield predictions. To perform this training, training module and central inference module 118A may utilize the vision data generated by robots $108_{1-M}$ (which may be retrieved, obtained, and/or provided by a central vision data module 114A) in concert with other data 124.

As noted previously, one reason edge yield crop yield prediction system 104B is able to generate crop yield predictions in real time is that not all the vision data generated by robots $108_{1-M}$ (e.g., during a given time interval such as a day) is used by edge inference module 118B. Rather, in some implementations, sampling module 116 may be configured to sample subset(s) of the vision data, such as a subset of individual digital images acquired by a robot 108 during a given time interval. These sampled subsets of data may then be applied, e.g., by edge inference module 118B, as input across one or more machine learning models stored in edge database 120B to generate output indicative of a crop yield prediction. Example sampling techniques that may be employed by sampling module 116 will be described shortly.

By contrast, central inference module 118A may have the virtually limitless resources of the cloud at its disposal. Accordingly, central inference module 118A may apply all of the vision data generated by robots $108_{1-M}$ (e.g., a superset of high resolution digital images acquired during a given time interval) as input across machine learning model(s) stored in central database 120A to generate the delayed crop yield predictions described previously. And in some implementations, training module 122 may train the machine learning model(s) stored in database 120A based on a comparison of these delayed crop yield predictions to real time crop yield predictions generated by edge inference module 118B using sample subset(s) of the same superset of high resolution digital images. Based on such a comparison, training module 122 may employ techniques such as back propagation and/or gradient descent to update the machine learning model(s) stored in central database 120A. The updated machine learning model(s) may subsequently be used by both edge inference module 118B and central inference module 118A to generate, respectively, real time and delayed crop yield predictions.

In some implementations, edge crop yield prediction system 104B may employ techniques other than (or in addition to) subset sampling in order to generate real time crop yield predictions more quickly and/or accurately. For example, and as described previously, one or more components of edge crop yield prediction system 104B such as vision data module 114B and/or edge inference module 118B may process a subset of high resolution images sampled by sampling module 116 to generate one or more image embeddings (or vectors). In some such implementations, this processing may include applying the subset of high resolution digital images as input across at least a portion of a machine learning module such as a CNN to generate the image embeddings/vectors. Using image embeddings may be more efficient than counting individual crops (which may require 3D reconstruction from a point cloud, object tracking, etc.) because with image embeddings, it is possible to estimate the density of plant parts of interest (e.g., strawberries), rather than counting individual plant parts of interest. Density of plant parts of interest may be measured per plant, per meter, etc.

In some such implementations, a plurality of constituent image embeddings may be combined together, e.g., using concatenation, averaging, etc., to form a composite embedding that represent crops across the area. In particular, this composite embedding may represent the crops' states during a given time interval, such as the time interval that robots $108_{1-M}$ acquire vision data for the whole field 112. In some implementations, such a composite embedding may be generated each day. Sequences of composite embeddings corresponding to sequences of days may then be applied, e.g., by edge inference module 118B, as inputs across a machine learning model capable of analyzing sequences of data (e.g., iterative machine learning models), such as an RNN, LSTM network, GRU network, transformer network, etc. As days progress, the sequence of composite embeddings grows. The output from such models at a given time iteration, such as the most recent composite image embedding, may be indicative of a prediction crop yield. Because composite image embeddings (and image embeddings in general) have fewer dimensions than high resolution images, this processing may generate crop yield predictions in real time.

As noted previously, various types of machine learning models may be applied by inference modules 118A/B to generate crop yield predictions (real time and delayed). Additionally, various types of machine learning models may be used to generate image embeddings that are applied as input across the crop yield prediction various machine learning models. These various models may include, but are not limited to, RNNs, LSTM networks (including bidirectional), transformer networks, feed-forward neural networks, CNNs, support vector machines, random forests, decision trees, etc.

Additionally, other data 124 may be applied as input across these models besides vision data or embeddings generated therefrom. Other data 124 may include, but is not limited to, historical data, weather data, soil data, data about chemicals and/or nutrients applied to crops and/or soil, sunlight data, pest data, crop cycle data, previous crop yields, farming techniques employed, and so forth. Weather data may be obtained from various sources, such as regional/county weather stations, weather sensors that are local to individual edge sites 102, mobile weather stations (e.g., deployed on a robot 108 or separately), etc. In implementations in which local weather and/or local weather sensors are not available, weather data may be extrapolated from other areas for which weather data is available, and which are known to experience similar weather patterns (e.g., from the next county, neighboring farms, neighboring fields, etc.). In some cases, robots 108 may share weather data amongst themselves, e.g., if one robot lacks a weather-related sensor that another possesses.

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figure 2:
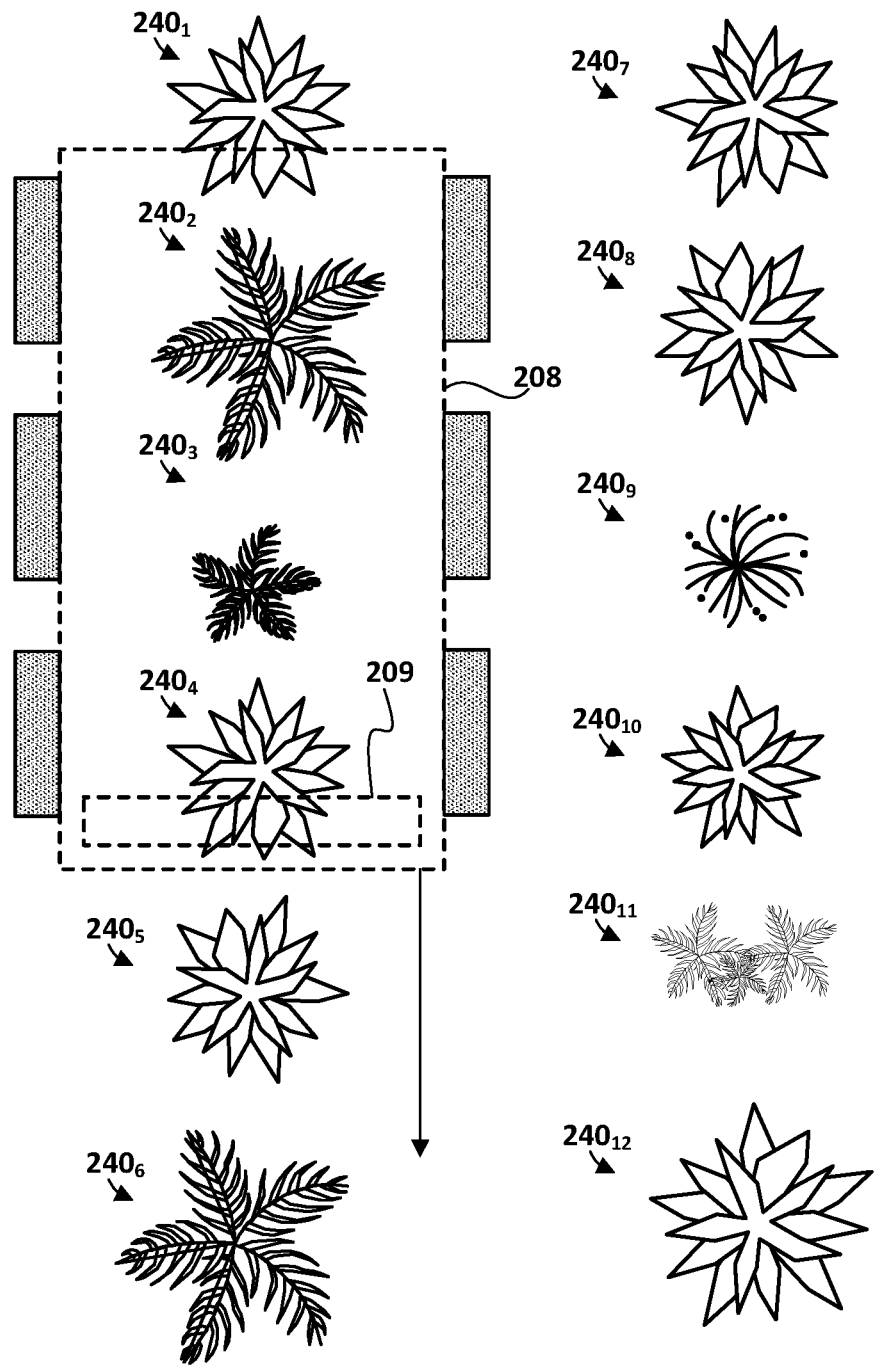
FIG. 2 depicts a robot deployed in an example field of plants to capture vision data that is processed in accordance with selected aspects of the present disclosure.

FIG. 2 depicts an example field of plants $240_{1-12}$ being scouted by a robot 208 to gather vision data (using a vision sensor 209) and possibly other data from sensor(s) onboard robot 208, e.g., atmospheric pressure, temperature, soil samples, etc. Robot 208 takes the form of a wheeled robot that is currently straddling (i.e., so that its wheels flank) a first row of plants $240_{1-6}$. Robot 208 is moving in the downward direction and may acquire 2D and/or 3D vision data periodically (e.g., every second, every two inches, every foot, every meter, etc.) or continuously (e.g., a video stream). Once robot 209 has traversed down and captured vision data of the first row of plants $240_{1-6}$, robot 209 may turn around and do the same for a second row of plants $240_{7-12}$, and for any number of additional rows of plants until the whole field is completed. As noted previously, in various implementations, robot 208 may have an onboard edge crop yield prediction system 104B to process the vision data locally, may delegate the vision processing to an edge crop yield prediction system 104B running on a nearby computer ("nearby" here meaning at the same edge site, in communication over one or more local area or personal area networks, etc.), or any combination of the two.

Figure 3:
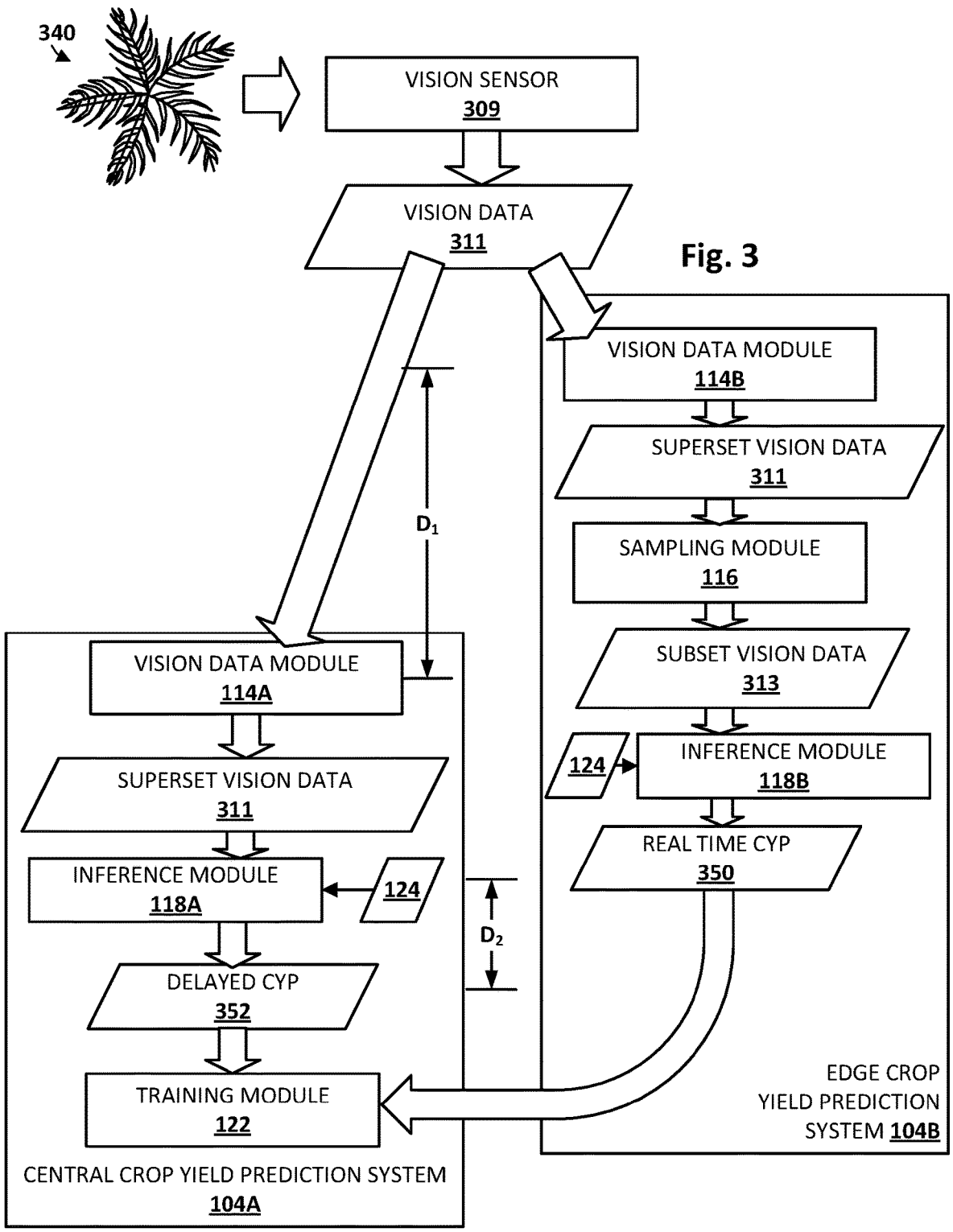
FIG. 3 schematically depicts one example of how vision data may be processed and used to make real time crop yield predictions, in accordance with various implementations.

FIG. 3 depicts one example of relative data flows between central crop yield prediction system 104A and edge crop yield prediction system 104B. These are not meant to be limiting. For example, in some implementations, once the machine learning modules employed by edge inference module 118B are sufficiently trained, comprehensive vision data captured by robots may not necessarily be physically transported (e.g., via portable hard drive) to central crop yield prediction system 104A, which may save on transportation costs and/or computing costs at central crop yield prediction system 104A.

Starting at the top, one or more vision sensors 309 of one or more robots (not depicted) are operated to capture vision data 311 of one or more plants 340. Vision data 311 may be processed immediately, or at least relatively soon (e.g., after one or more robots have completed scouting a field, end of day, etc.), by edge crop yield prediction system 104B. In particular, vision data module 114B may provide vision data 311 (which may be referred to herein as a "superset" of vision data) to sampling module 116. Sampling module 116 may employ various techniques discussed below to sample subset(s) 313 of vision data 311. These subset(s) 313 may be applied by edge inference module 118B as input across one or more machine learning modules, e.g., in concert with various other data 124, to generate a real time crop yield prediction ("CYP") 350.

Meanwhile, vision data 311 may also be transported physically to central crop yield prediction system 104A. As shown in FIG. 3, this introduces a first temporal delay $D_1$, which may be hours, days, or even longer. Central vision data module 114A may provide the superset of vision data 311 to central inference module 118A. Central inference module 118A may apply the superset of vision data 311, e.g., in concert with other data 124, across one or more machine learning models (e.g., identical to or similar to those used by edge inference module 118B) to generate a delayed crop yield prediction 352. As noted previously, the delayed crop yield prediction 352 may be more accurate than real time crop yield prediction 350. However, this processing may be computationally expensive and may introduce another temporal delay, $D_2$, between generation of real time crop yield prediction 350 and delayed crop yield prediction 352. Temporal delays $D_1$ and $D_2$ in FIG. 3 are not drawn to scale. In fact, temporal $D_2$ may actually be inclusive of the delay represented by $D_1$ (travel time for portable hard drives) plus additional delay required for data processing by central crop yield prediction system 104A.

As shown by the curved arrow in FIG. 3, in some implementations, real time crop yield prediction 350 may be provided to training module 122 of central crop yield prediction system 104A. Training module 122 may compare this with delayed crop yield prediction 352 and, based on the comparison, train the one or more machine learning models. Training module 122 may then provide the updated machine learning model(s) to edge crop yield prediction system 104B for use by edge inference module 118B subsequently.

In other implementations, central crop yield prediction system 104A may train the machine learning model(s) using data other than its own delayed crop yield prediction 352. For example, strawberries may be harvested every three weeks or so. That means ground truth data, rather than highly accurate (if delayed) crop yield predictions, are also available every three weeks or so. Accordingly, in some implementations, central crop yield prediction system 104A, e.g., by way of training module 122, may train the machine learning models using actual ground truth data, or a combination of ground truth data and/or delayed crop yield predictions.

As alluded to earlier, sampling module 116 may employ various techniques to sample subset(s) of vision data from the superset(s) of vision data acquired by robots $108_{1-M}$. For example, in some implementations, sampling module 116 may sample a subset of high resolution images (to generate a real time crop yield prediction) from another subset of the high resolution images. This other subset of high resolution images may have been acquired by robot(s) in one or more predetermined sectors of an area such as field 112 that include plants likely to produce yields that are representative of all crops in field 112. In various implementations, heuristics or other rules may be applied to ensure that no matter where samples are selected from, no two samples are selected from vision data acquired from the same plant, or proximate plants, e.g., to avoid double counting fruit.

FIGS. 4A-C demonstrate one example of how satellite imagery may be used to identify which sectors of a field should be considered when selecting subsets of high resolution images of crops. In FIGS. 4A-C, satellite imagery reveals that a field 412 includes three sectors, 412A-C, that are likely to produce different crop yields (e.g., based on plant health evidenced by plant colors, coverage, infrared data, etc.). First sector 412A is shaded the lightest because the satellite imagery reveals that it is likely to be the lowest producing sector of field 412. Second sector 412B is likely to be the second highest producing sector of field 412, and third sector 412C is likely to produce the highest yield.

With this knowledge, various approaches can be taken, e.g., by sampling module 116, to select samples of vision data acquired from among these sectors 412A-C. In FIG. 4A, ten samples are selected (e.g., randomly) from vision data acquired at ten locations (marked with x's) in second sector 412B because second sector 412B is likely (based on satellite data at least) to the middle-producing sector. In FIG. 4B, ten samples are selected from vision data acquired at ten locations more or less evenly distributed across all three sectors. And in FIG. 4C, ten samples are selected from vision data acquired at ten locations within first sector 412A. The rationale behind the approach demonstrated by FIG. 4C is to be conservative with crop yield predictions, e.g., to avoid over-promising and under-delivering.

Figure 5A:
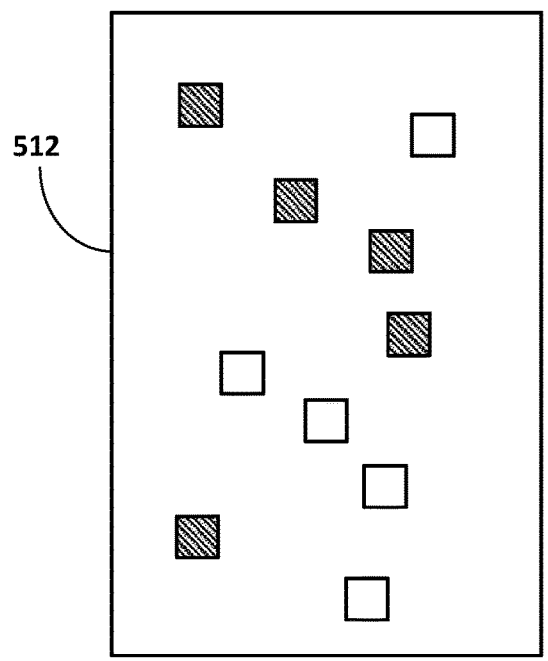
FIGS. 5A and 5B depict an example of how sectors of a field may be identified as suitable for sampling.
Figure 5B:
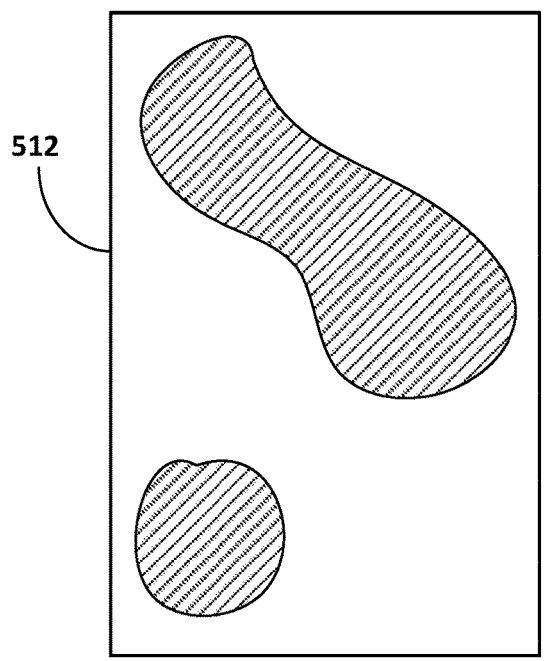

FIGS. 5A and B depict another approach for identifying field sectors from which samples should be taken to generate the most accurate crop yield predictions. The technique used in FIGS. 5A-B relies on the cross entropy method to reduce the search space from which samples should be taken. In FIG. 5A, the boxes represent small portions of a field 512 from vision data is sampled to generate crop yield predictions. In particular, each box represents a separate portion of field 512 from which sampling module 116 can sample a distinct candidate subset of high resolution images. Crop yields predicted, e.g., by edge inference module 118B or central inference module 118A, based on these separate subsets of high resolution image may be compared to ground truth and/or delayed crop yield predictions for the entire field 512 to determine which subsets generated the most accurate predictions. The shaded boxes in FIG. 5A represent those five sectors that generated the most accurate predictions. Regression analysis, cross entropy processing, or other similar techniques may then be employed to identify the two "shapes" (sectors) in FIG. 5B that capture the most accurate sectors of field 512. Moving forward, sampling module 116 may sample vision data acquired within those shapes/sectors of field 512.

Figure 6A:
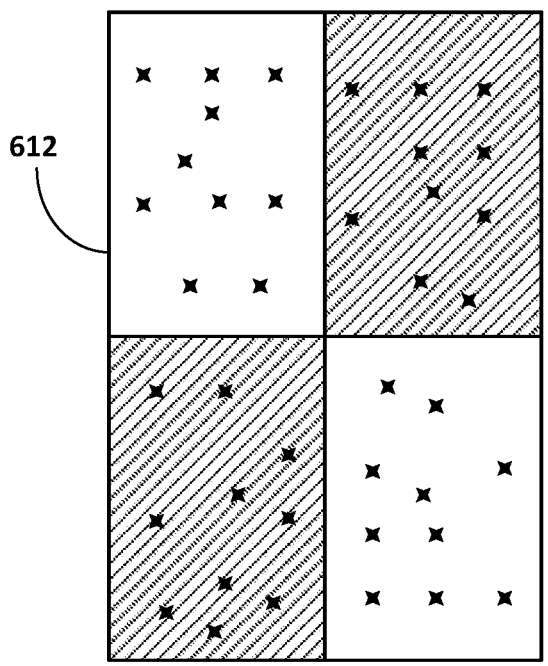
FIGS. 6A, 6B, 6C, and 6D depict another example of how sectors of a field may be identified as suitable for sampling.
Figure 6B:
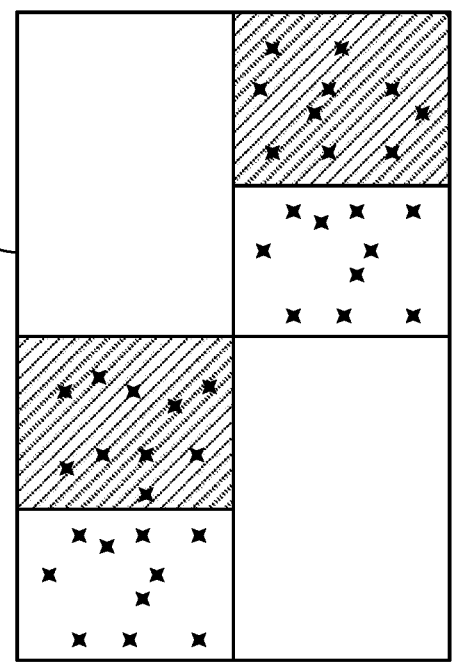
Figure 6C:
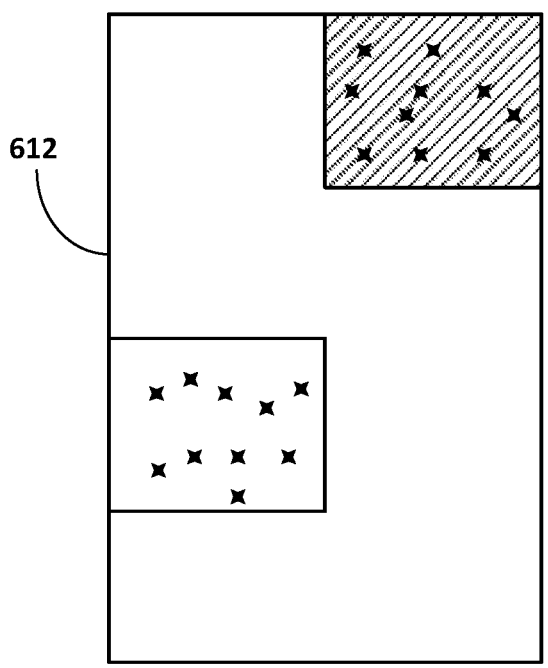

FIGS. 6A-C depicts an alternative approach for identifying suitable sampling sectors of a field 612 that also relies on cross entropy techniques. In FIG. 6A, field 612 is divided into four quadrants, and ten samples are acquired from vision data captured at ten locations (marked with x's) within each quadrant. Samples taken from vision data acquired in the two shaded quadrants (top right, bottom left) generated the most accurate crop yield predictions. Accordingly, in FIG. 6B, additional samples are taken from vision data acquired within those two quadrants. Samples are not taken from vision data acquired in the bottom right or top left quadrants.

Figure 6D:
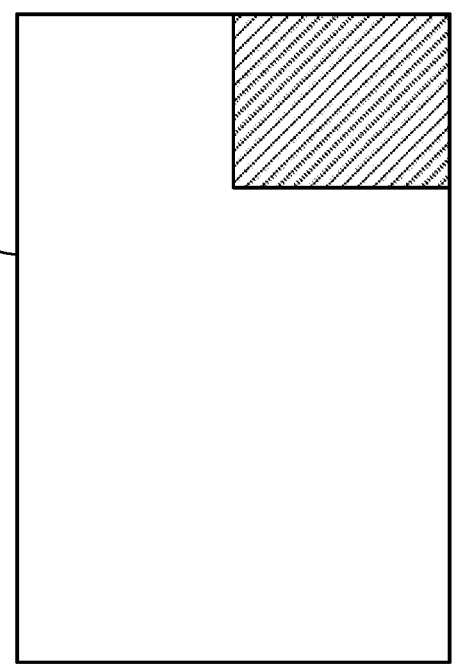

As shown in FIG. 6B, samples taken from vision data captured in the top right octant and the second-from-bottom-left octant generated the most accurate crop yield predictions. Accordingly, in FIG. 6C, additional samples are taken from vision data acquired within those two octants. This process can be iterated for as long as desired. For example, in FIG. 6D it is revealed that vision data acquired in the top right octant is likely to generate the most accurate crop yield predictions. Moving forward, vision data captured in that octant may be used, e.g., by sampling module 116, for sampling purposes.

In some implementations, rather than sampling from a superset of robot-acquired vision data, sampling module 116 may cause robots to only acquire vision data in sampled locations across a field. For example, if the vision data acquired by robots $108_{1-M}$ is not (or no longer) going to be used by central crop yield prediction system 104A to train machine learning model(s), then there may be little reason to acquire and physically transport massive amounts of vision data acquired by robots 108 to central crop yield prediction system 104A. Accordingly, sampling module 116 may cause robots $108_{1-M}$ to acquire images only at locations selected by sampling module 116. For example, sampling module 116 may randomly generate some number of position coordinates constrained to within a sector of a field previously identified as likely to be accurately representative of the field's crop yield as a whole. These position coordinates (which may also be selected to be not too proximate each other to avoid double counting) may be provided to robot(s) so that the robots acquire vision data at those locations, and perhaps not elsewhere.

Figure 7:
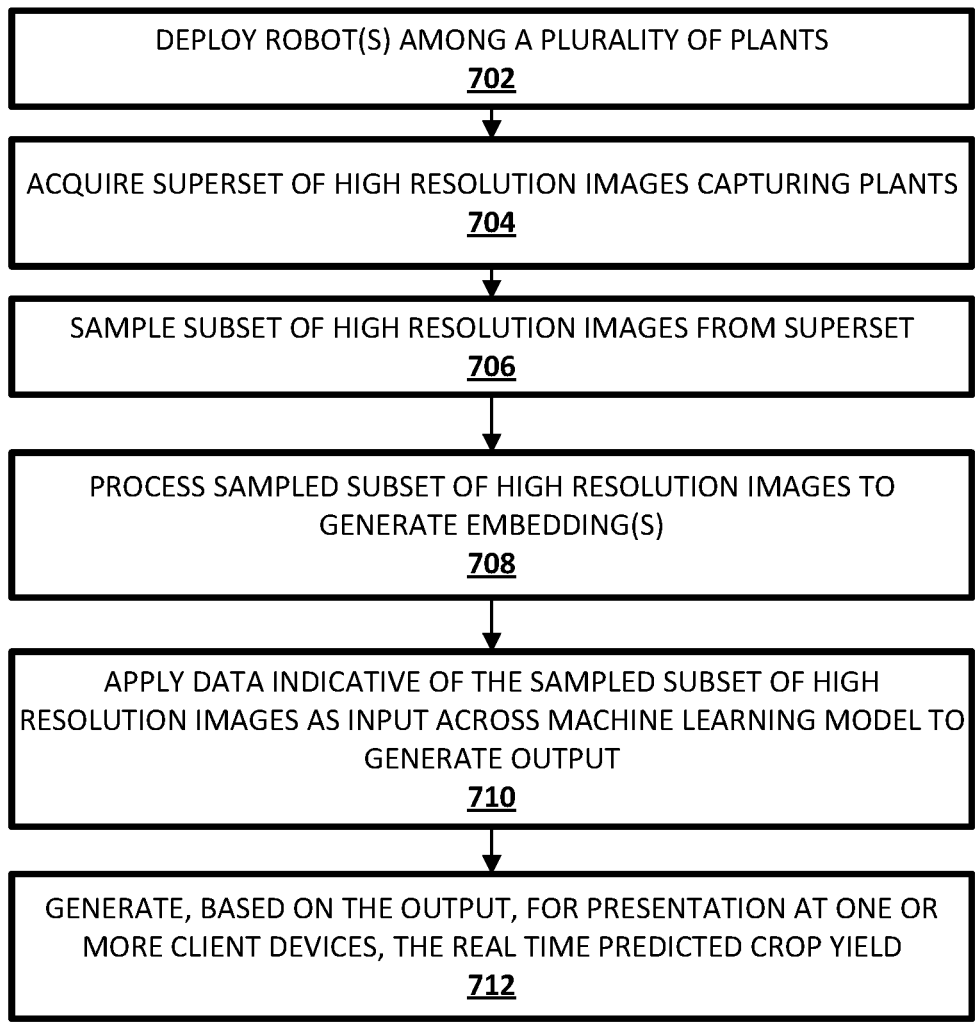
FIG. 7 a flowchart of an example method in accordance with various implementations described herein.

FIG. 7 illustrates a flowchart of an example method 700 for practicing selected aspects of the present disclosure. The operations of FIG. 7 can be performed by one or more processors, such as one or more processors of the various computing devices/systems described herein, such as by crop yield prediction system 104. For convenience, operations of method 700 will be described as being performed by a system configured with selected aspects of the present disclosure. Other implementations may include additional steps than those illustrated in FIG. 7, may perform step(s) of FIG. 7 in a different order and/or in parallel, and/or may omit one or more of the steps of FIG. 7.

At block 702, the system may deploy one or more robots amongst a plurality of plants, and at block 704, the system may acquire, using one or more vision sensors of one or more of the robots, a superset of high resolution images that depict the plurality of plants. At block 706, the system, e.g., by way of sampling module 116, may sample, from the superset of high resolution images, a subset of multiple high resolution images. As noted previously, sampling module 116 may use various techniques and/or data (e.g., satellite imagery, cross entropy techniques) to identify sector(s) of an area such as a field that are likely to be representative of the area as a whole. Vision data acquired in these sector(s) may be more likely than vision data acquired in other sector(s) to produce accurate real time crop yield predictions.

The sampling performed by sampling module 116 at block 706 may involve sampling individual high resolution images (e.g., still images, video frames, etc.). In order to further reduce the amount of data processed (and hence, the latency associated with real time crop yield prediction), in some implementations, at block 708, the system may process the sampled subset of high resolution images further, e.g., by down sampling and/or reducing its dimensionality to generate one or more embeddings. These embedding(s) may then comprise the data indicative of the subset of high resolution images that is utilized at block 710. In some implementations, the processing of block 708 may include applying the subset of high resolution images as input across a CNN, which may be upstream from the machine learning model used at block 710. In some cases, this CNN may include one or more layers that are selected to reduce the dimensionality of the data, such as one or more pooling layers (e.g., average pooling, max pooling, global pooling, etc.). In some implementations, the processing of block 708 may include combining a plurality of constituent image embeddings together, e.g., using averaging, to form a composite embedding that represent crops across the area.

At block 710, the system, e.g., by way of edge inference module 118B, may apply data indicative of the sampled subset of high resolution images as input across a machine learning model, e.g., in concert with other data 124—e.g., local weather data, historical data, farming practices data, etc.—to generate output indicative of a real time crop yield prediction. This data indicative of the sampled subset may include the individual images of the sampled subset and/or reduced dimension embeddings generated therefrom. At block 712, the system may generate, based on the output, e.g., for presentation at one or more client devices 106, the real time predicted crop yield. In various implementations, the sampling, applying, and/or generating may be performed at a computing system that is local to an edge site 102, onboard one or more robots $108_{1-M}$, or any combination thereof.

Figure 8:
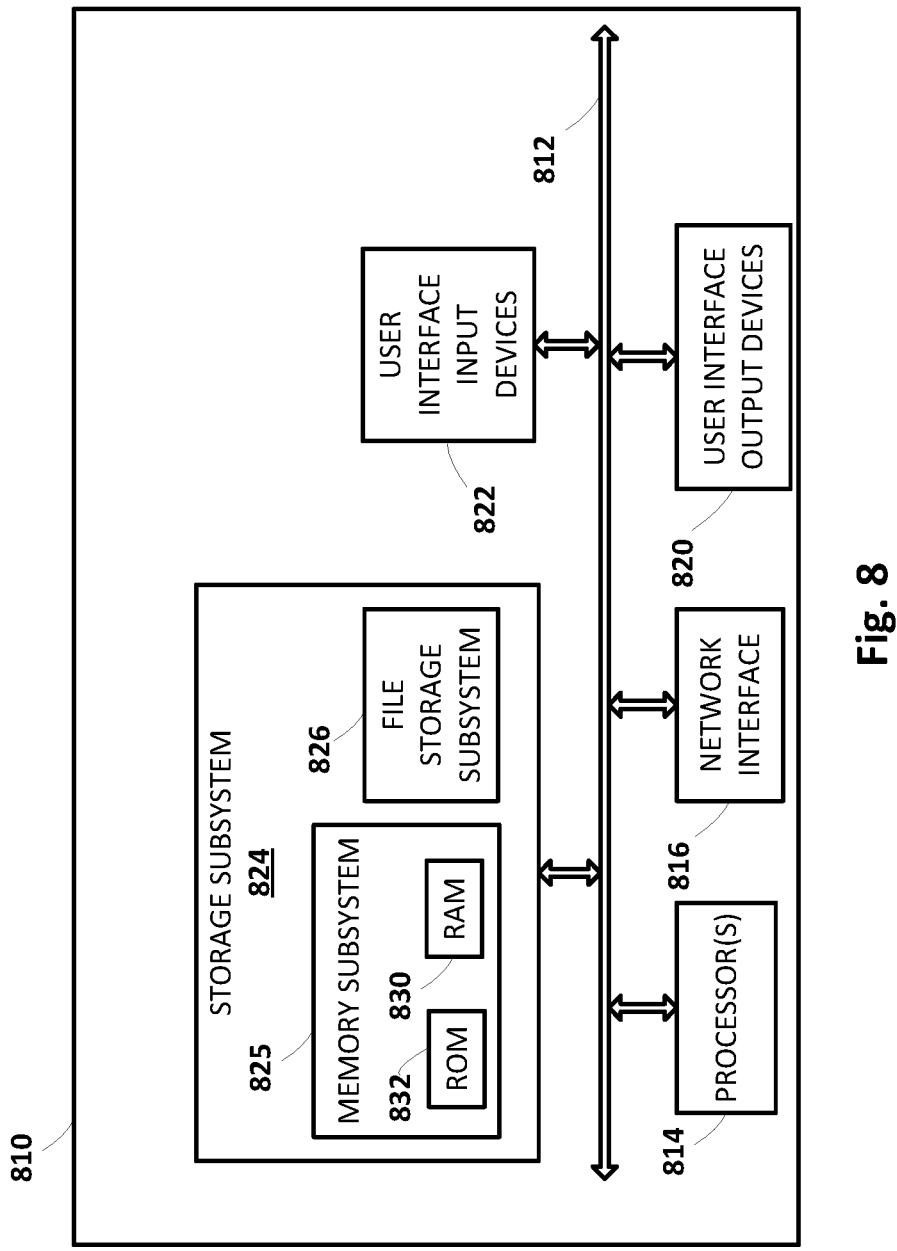
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 810 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method 700 described herein, as well as to implement various components depicted in FIGS. 1 and 3.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for predicting crop yield of a crop in an area in real time, the method implemented using one or more processors local to the area, and comprising:

deploying one or more robots amongst a plurality of plants;

acquiring, using one or more vision sensors of one or more of the robots, a superset of high resolution images that depict the plurality of plants;

sampling, from the acquired superset of high resolution images using one or more of the processors local to the area, a subset of the acquired superset of high resolution images;

processing the subset of high resolution images using a first machine learning model to generate one or more reduced-dimensionality image embeddings;

applying, by one or more of the processors local to the area, the one or more reduced-dimensionality image embeddings as input across a second machine learning model, along with local weather data, to generate output indicative of a real time crop yield prediction, without applying data indicative of other acquired images of the superset outside of the subset as input across the second machine learning model; and generating, based on the output using one or more processors local to the area, for presentation at one or more computing devices, the real time crop yield prediction.

2. The method of claim 1, wherein the sampling, applying, and generating are performed onboard one or more of the robots.

3. The method of claim 1, wherein the processing comprises applying the subset of high resolution images as input across a convolutional neural network.

4. The method of claim 3, further comprising averaging or concatenating a plurality of constituent image embeddings together to form a composite embedding that represents crops across the area.

5. A method for predicting crop yield of a crop in a field in real time, the method implemented using one or more processors local to the field, and comprising:

deploying one or more vehicles amongst a plurality of plants;

acquiring, using one or more vision sensors of one or more of the vehicles, a superset of high resolution images that depict the plurality of plants;

selecting a portion of the field that is more predictive of the field's crop yield as a whole than another portion of the field;

sampling a subset of high resolution images from another subset of the high resolution images that were acquired by one or more of the vehicles while traveling through the selected portion of the field;

applying, by one or more of the processors local to the field, data indicative of the sampled subset of high resolution images as input across a machine learning model, along with local weather data, to generate output indicative of a real time crop yield prediction, without applying data indicative of other acquired images of the superset outside of the sampled subset as input across the machine learning model; and generating, based on the output using one or more processors local to the field, for presentation at one or more computing devices, the real time crop yield prediction.

6. The method of claim 5, further comprising:
analyzing one or more satellite images of the field to identify a plurality of distinct portions of the field that correspond to distinct portions of the one or more satellite images having different colors or infrared values;
wherein the selecting is based on the portions of the one or more satellite images.

7. The method of claim 5, wherein the selecting is based on relative accuracies of past real time predicted crop yields generated from respective sampled subsets of high resolution images acquired by one or more of the vehicles while travelling through respective distinct portions of the field.

8. The method of claim 5, wherein the selecting comprises:
sampling, from the superset of high resolution images, a plurality of sampled subsets, wherein each sampled subset consists of images acquired by one or more of the vehicles while travelling through a respective portion of the field;
generating a plurality of crop yield predictions based on the plurality of sampled subsets; and
selecting, as the portion of the field that is more predictive of the field's crop yield as a whole, the portion of the field from which the sampled subset yielded a crop yield prediction that most closely matched a delayed crop yield prediction generated based on the superset of high resolution images.

9. A method for training a first machine learning model to predict crop yield of a crop in an area in real time, the method implemented using one or more processors local to the area, and comprising:
deploying one or more robots amongst a plurality of plants;
acquiring, using one or more vision sensors of one or more of the robots, a superset of high resolution images that depict the plurality of plants;
sampling, from the acquired superset of high resolution images, a subset of the acquired superset of high resolution images;
processing the sampled subset of high resolution images using a second machine learning model to generate one or more reduced-dimensionality image embeddings;
applying the one or more reduced-dimensionality image embeddings as input across the first machine learning model, along with local weather data, to generate output indicative of a real time crop yield prediction, without applying other acquired images of the superset outside of the subset as input across the first machine learning model;
comparing the real time crop yield prediction to a delayed crop yield prediction generated based on the acquired superset of high resolution images, wherein the delayed crop yield prediction is more accurate than the real time crop yield prediction; and
training the machine learning model based on the comparing.

10. A system comprising one or more processors and memory storing instructions that, in response to execution of the instructions by the one or more processors, cause the one or more processors to perform the following operations
receive, by way of one or more vision sensors of one or more robots, a superset of high resolution images that depict a plurality of plants in an area, wherein the one or more robots were deployed amongst the plurality of plants to acquire the superset of high resolution images;
sample, from the acquired superset of high resolution images, a subset of the acquired superset of high resolution images;
process the subset of high resolution images using a first machine learning model to generate one or more reduced-dimensionality image embeddings;
apply the one or more reduced-dimensionality image embeddings as input across a second machine learning model, along with local weather data, to generate output indicative of a real time crop yield prediction, without data indicative of other acquired images of the superset outside of the subset being applied as input across the second machine learning model; and
generate, based on the output, for presentation at one or more computing devices, the real time crop yield prediction.

11. The system of claim 10, wherein the system comprises one or more of the robots.

12. The system of claim 10, further comprising instructions to apply the subset of high resolution images as input across a convolutional neural network.

13. The system of claim 12, further comprising instructions to average or concatenate a plurality of constituent image embeddings together to form a composite embedding that represent crops across the area.

14. A system comprising one or more processors and memory storing instructions that, in response to execution of the instructions by the one or more processors, cause the one or more processors to perform the following operations
receive, by way of one or more vision sensors of one or more robots, a superset of high resolution images that depict a plurality of plants in a field, wherein the one or more robots were deployed amongst the plurality of plants to acquire the superset of high resolution images;
select a portion of the field that is more predictive of the field's crop yield as a whole than another portion of the field;
sample a subset of high resolution images from another subset of the high resolution images that were acquired by one or more of the robots while traveling through the selected portion of the field;
apply data indicative of the subset of high resolution images as input across a machine learning model, along with local weather data, to generate output indicative of a real time crop yield prediction, without data indicative of other acquired images of the superset outside of the subset being applied as input across the machine learning model; and
generate, based on the output, for presentation at one or more computing devices, the real time crop yield prediction.

15. The system of claim 14, further comprising instructions to analyze one or more satellite images of the field to identify a plurality of distinct portions of the field that correspond to distinct portions of the one or more satellite images having different colors or infrared values; and
select the portion of the field based on the plurality of distinct portions of the one or more satellite images.

16. The system of claim 14, wherein the portion of the field that is more predictive of the field's crop yield is selected based on relative accuracies of past real time predicted crop yields generated from respective sampled subsets of high resolution images acquired by one or more of the robots while travelling through respective distinct portions of the field.

17. The system of claim 14, wherein the instructions to select include instructions to:
- sample, from the superset of high resolution images, a plurality of sampled subsets, wherein each sampled subset consists of images acquired by one or more of the robots while travelling through a respective portion of the field;
- generate a plurality of crop yield predictions based on the plurality of sampled subsets; and
- select, as the portion of the field that is more predictive of the field's crop yield as a whole, the portion of the field from which the sampled subset yielded a crop yield prediction that most closely matched a delayed crop yield prediction.

* * * * *